United States Patent [19]
Igarashi

[11] Patent Number: 5,555,021
[45] Date of Patent: Sep. 10, 1996

[54] COMPACT TELEVISION CAMERA WITH SWITCHING NOISE PREVENTION

[75] Inventor: Shigemi Igarashi, Kawasaki, Japan

[73] Assignee: Watec America Corporation, Westlake Vlg, Calif.

[21] Appl. No.: 403,577

[22] Filed: Mar. 14, 1995

Related U.S. Application Data

[63] Continuation of Ser. No. 167,409, Dec. 14, 1993, abandoned.

[51] Int. Cl.$^6$ .................................................. H04N 5/225
[52] U.S. Cl. .......................... 348/222; 348/241; 348/372; 348/312
[58] Field of Search ................................. 348/207, 372, 348/222, 217, 241, 625, 312; 330/199; H04N 5/225

[56] References Cited

U.S. PATENT DOCUMENTS

| | | | |
|---|---|---|---|
| 3,969,579 | 7/1976 | Logan et al. | 348/625 |
| 5,111,233 | 5/1992 | Yokonuma et al. | 354/416 |
| 5,179,445 | 1/1993 | Hadfield | 348/217 |
| 5,191,425 | 3/1993 | Hachiyama et al. | 348/312 X |

OTHER PUBLICATIONS

Lancaster, D. *Active Filter Cookbook* Indianapolis, Howard W. Sams & Co., Inc., 1975. pp. 10, 14, 25–26, 66–67.

*Primary Examiner*—Wendy R. Greening
*Attorney, Agent, or Firm*—David O'Reilly

[57] ABSTRACT

An object of the present invention is to provide a compact television camera having a circuit that prevents switching noises by that a transistor of a power supply circuit being switched on for a dc-dc converter only during a blanking period eliminates the need for a transformer and shielding box for the dc- dc converter circuit and a low-pass filter circuit, thereby allowing the camera body to be made smaller. The compact television camera circuit, comprises in combination, a synchronizing signal generator (1), a timing signal generator (2) for generating a timing signal from said synchronizing signal generator (1) output, a vertical driver (3) and a horizontal driver (4) for generating vertical and horizontal scanning signals using the timing signal, a CCD pick-up device (5), a low-pass filter (8) for eliminating the high-frequency components of a video signal (b) output of said CCD pick-up device (5), and an output amplifier (11) for feeding out the video output signal (a). The low-pass filter (8) is an active low-pass filter formed of an emitter follower amplifier having a unity gain of 1. The power supply circuit (20) is formed of a charging circuit of the double-voltage charging type, wherein a trigger signal (c) of the synchronizing signal generator (1) for triggering said power supply circuit (20) is a signal (c1) or (c2) having a rising edge and a falling edge during a blanking period BLK of the video signal (b).

1 Claim, 6 Drawing Sheets

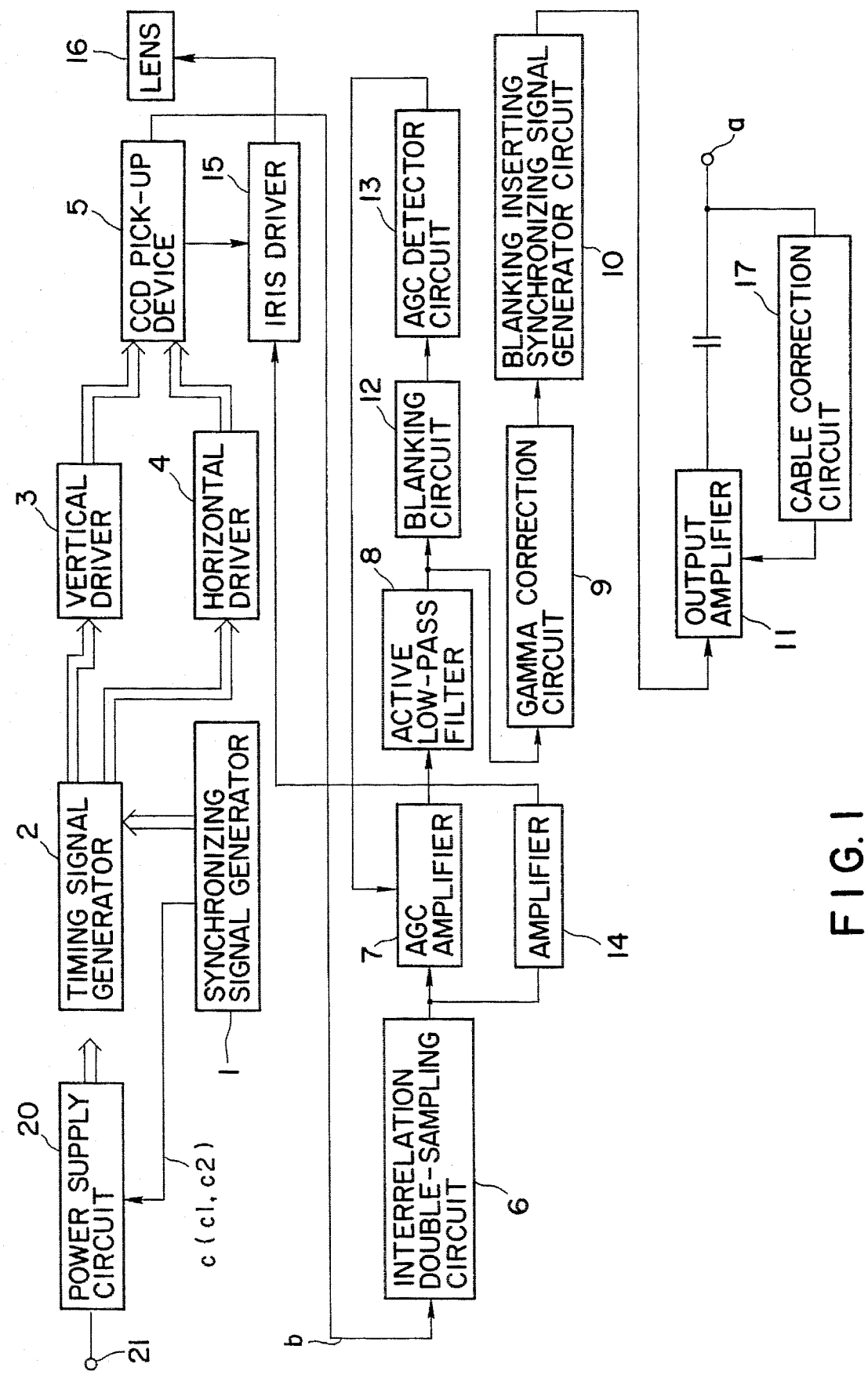
F I G. 1

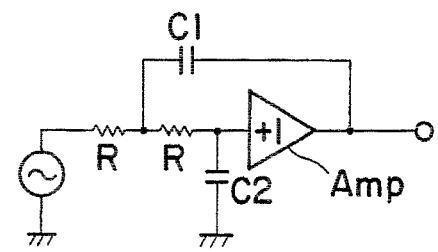
F I G. 5
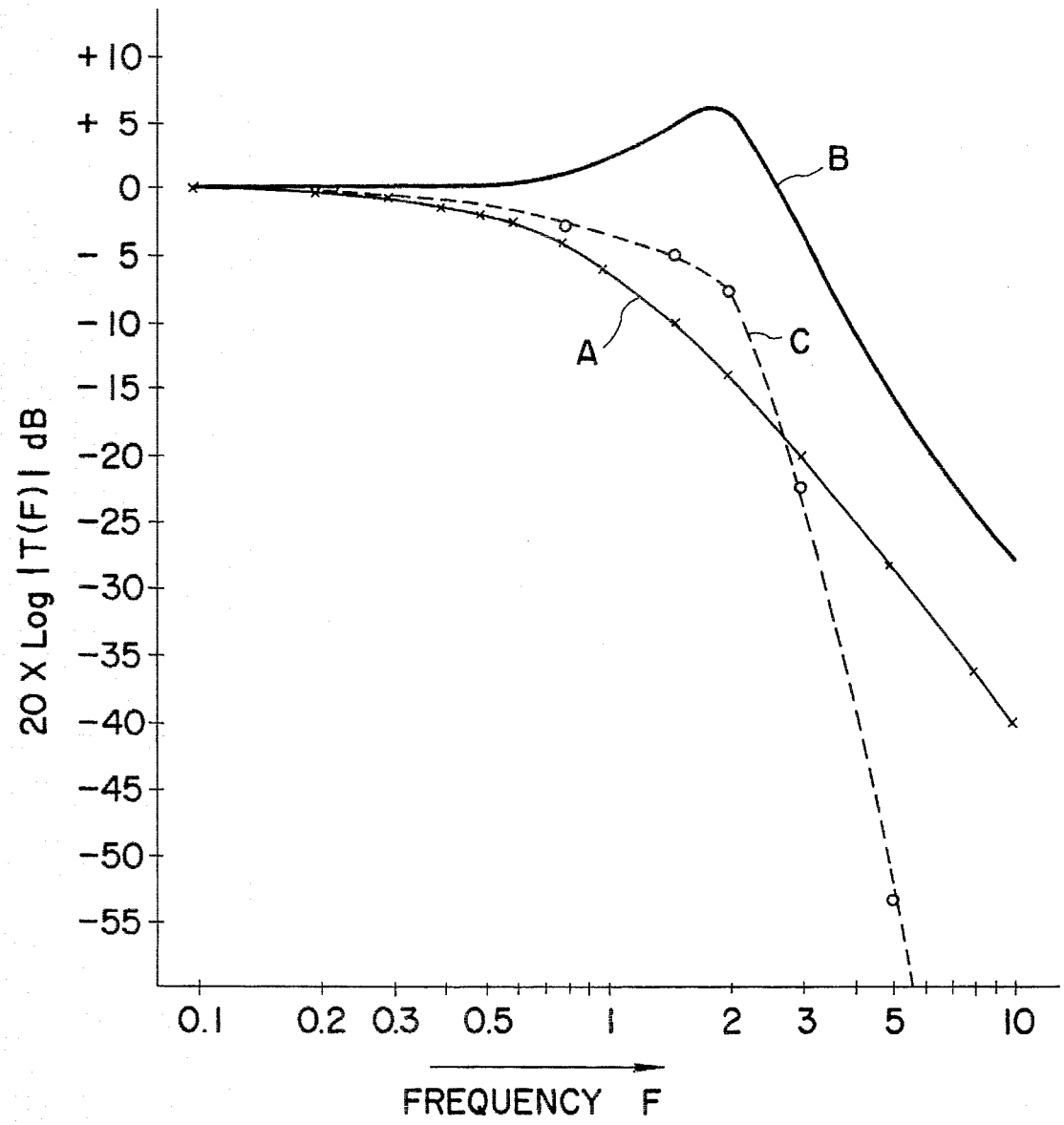
F I G. 6

COMPACT TELEVISION CAMERA WITH SWITCHING NOISE PREVENTION

This is a continuation of application Ser. No. 08/167,409 filed on Dec. 14, 1993 now abandoned.

BACKGROUND OF THE INVENTION

1. Field of the Invention

The present invention relates to a compact television camera.

2. Background Information

Usually television cameras use a 12 V battery power supply. To drive the television camera, +15 and −9 V power sources are needed. For this, a large dc-dc converter having a transformer built therein is used. To prevent switching noises due to the converter from affecting other circuits, the converter has to be ordinarily specifically designed. However, the dc-dc converter circuit and low-pass filter circuit (LPF) are made large because they must use a transformer and shielding box.

SUMMARY OF THE INVENTION

In view of the foregoing, it is an object of the present invention to provide a compact television camera which prevents switching noises in a way that a transistor of a power supply circuit is switched on for dc-dc conversion only during a blanking period without using a transformer and shielding box for the dc- dc converter circuit and a low-pass filter circuit, thereby allowing the camera body to be smaller.

Other objects and advantages of the invention will become more apparent from the following portion of this specification and from the accompanying drawings.

BRIEF DESCRIPTION OF THE DRAWINGS

FIG. 1 is a block diagram illustrating an embodiment of the present invention.

FIG. 5 is a circuit diagram illustrating a basic circuit for the low-pass filter.

FIG. 6 is a graph illustrating frequency response curves of the power supply circuit.

Figure 2:
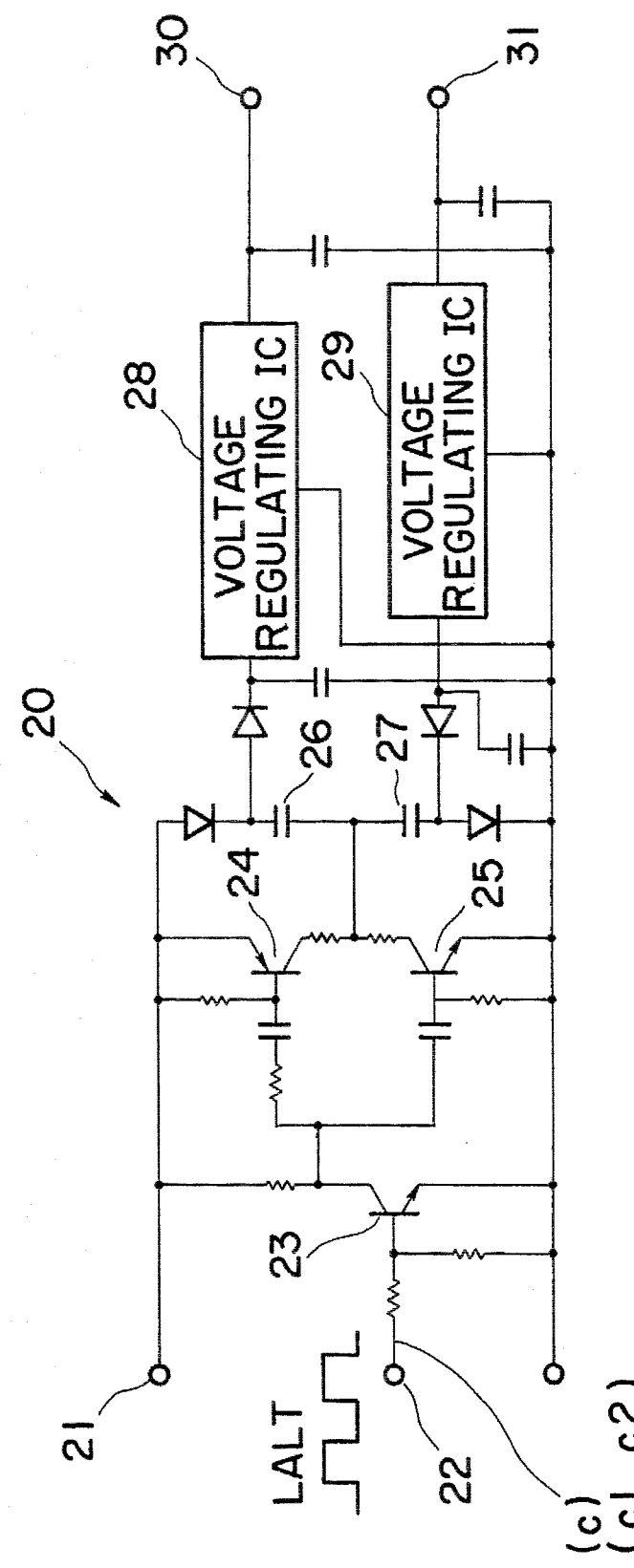
FIG. 2 is a circuit diagram illustrating a power supply circuit.

While the principles of the invention have been described above in connection with specific embodiments, and particular modifications thereof, it is to be clearly understood that this description is given only by way of example and not as a limitation on the scope of invention.

DESCRIPTION OF THE PREFERRED EMBODIMENTS

FIG. 1 depicts a block diagram illustrating a drive circuit for the television camera of the present invention. A pulse output of synchronizing signal generator 1 drives timing signal generator 2. A signal output of timing signal generator 2 drives vertical driver 3 and horizontal driver 4. Scanning signal outputs of vertical driver 3 and horizontal driver 4 drive CCD pick-up device 5. Video signal (b) obtained from CCD pick-up device 5 has high-frequency components eliminated by an interrelation double-sampling circuit 6, an AGC amplifier 7, an active low-pass filter 8, gamma correction circuit 9, blanking inserting synchronizing signal generator circuit 10, and output amplifier 11 producing video output signal (a) shown in FIG. B. Video output signal (a) is fed to a television receiver (not shown). The signal output from low-pass filter 8 is fed back through blanking circuit 12 and AGC detector circuit 13 to AGC amplifier 7. The signal output of interrelation double-sampling circuit 6 drives lens 16 of the camera through amplifier 14 and an iris driver 15. In the figure, 17 indicates a cable correction circuit.

Power supply circuit 20 is a charging circuit of the double-voltage charging type. Pin 21 of power supply circuit 20 has a battery voltage of 12 V applied thereto. Power supply circuit 20 generates drive voltages of +15 V and −9 V with trigger signal (c) given from timing signal generator 2 as described above.

FIG. 2 depicts a circuit diagram ,illustrating power supply circuit 20. Trigger signal (c) on pin 22 triggers transistor 23. Transistors 24 and 25 are turned on or off with a proper phase difference. If transistor 24 is on, it charges capacitor 27 to a power voltage of +12 V. If transistor 25 is on, it charges capacitor 26 to a power voltage of +12 V. The sum of +24 V of +12 volt at pin 27 plus +12 volt at capacitor 26 is regulated to +15 V by voltage regulating IC 28 and the +12 volt at capacitor 26 is reversed to −12 V and regulated to −9 V by voltage regulating IC 29, respectively. The +15 V and −9 V drive voltages are fed out to pins 30 and 31, respectively.

Figure 3:
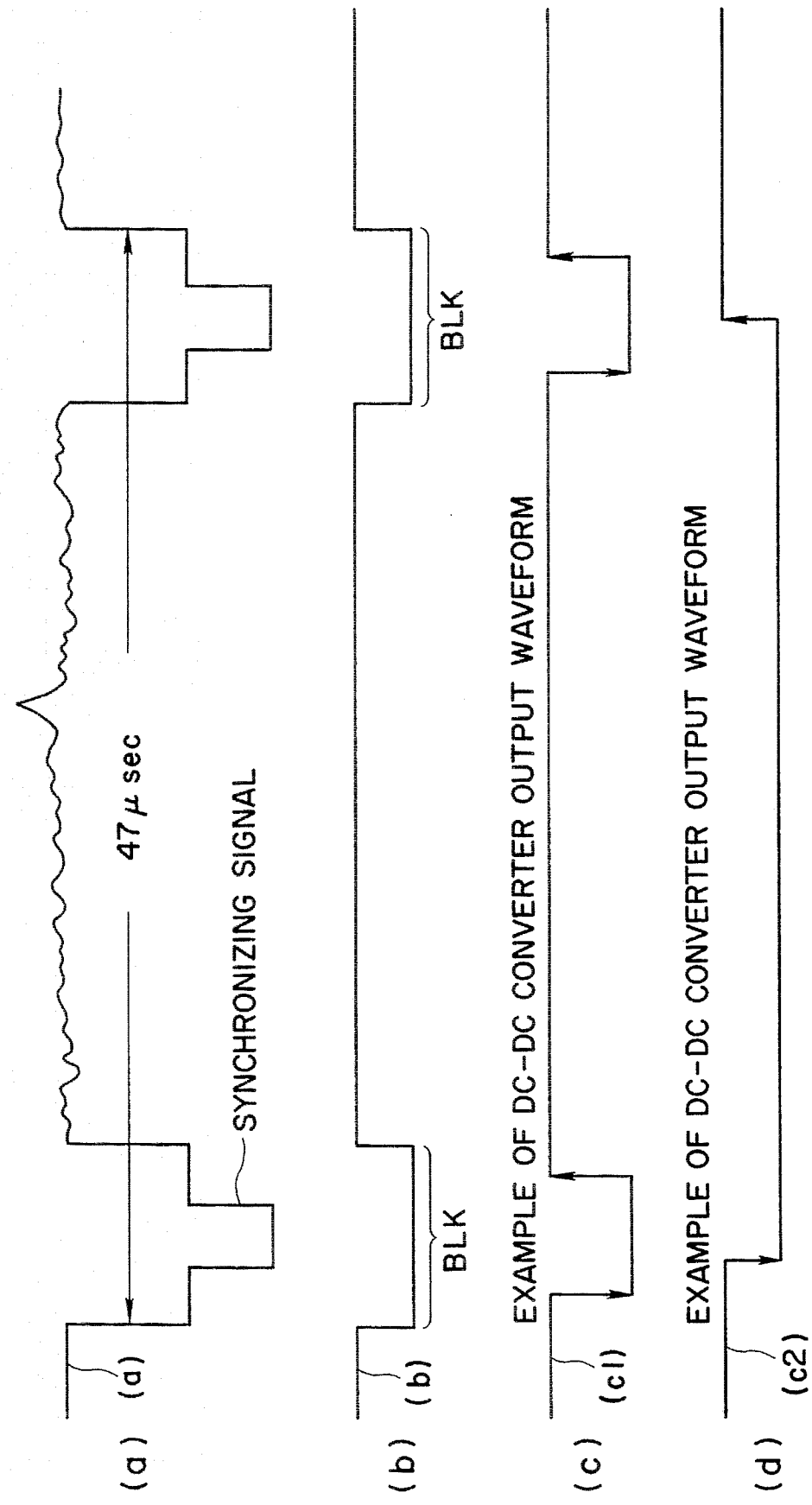
FIG. 3 are output waveforms of the power supply circuit.

Video signal (b) is shown in FIG. 3b. Trigger signal (c), like signal (c1), shown in FIG. 3, has a rising edge and a falling edge during blanking period BLK (with the output video signal being off) of video signal (b). Otherwise, trigger signal (c), like signal (c2), shown in FIG. 3, has a falling portion during a first blanking period and a second portion during a second blanking period. Because switching noise due to the rising or falling edge of trigger signal (c) occurs during the blanking period, it will not affect the video signal of output signal a. Thus, no shielding is needed for power supply circuit 20.

Figure 4:
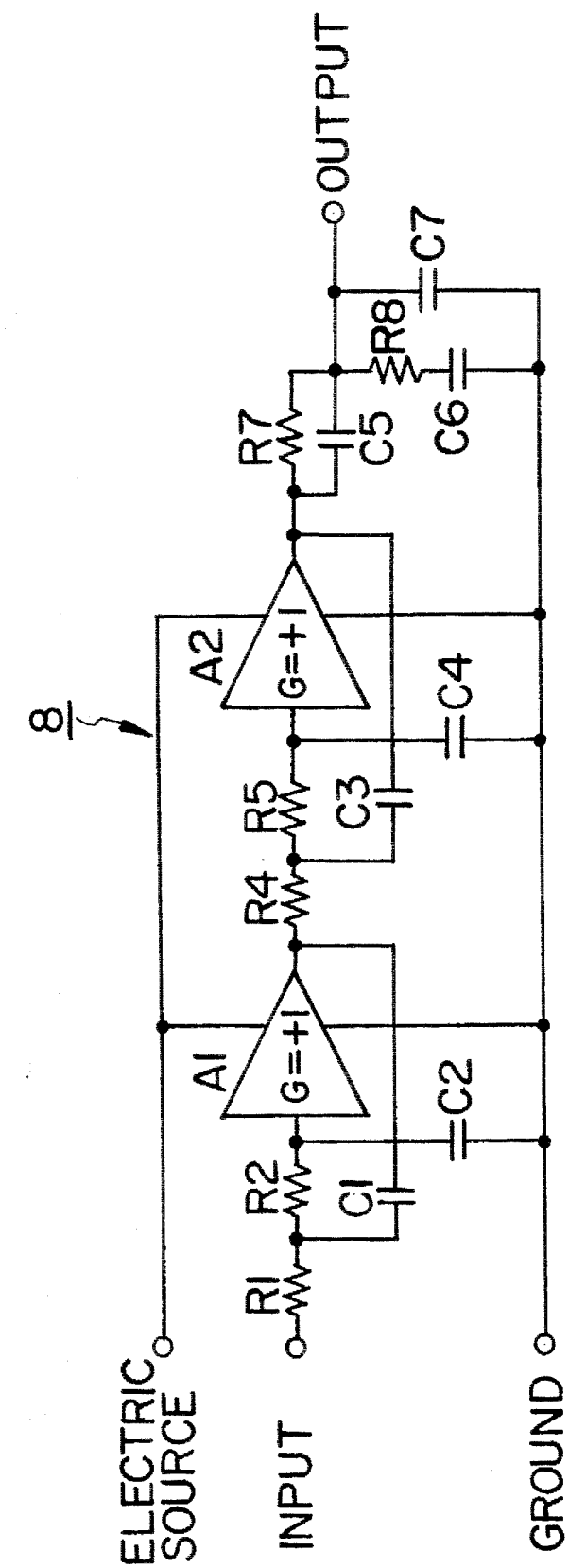
FIG. 4 is a circuit diagram illustrating a low-pass filter for the power supply circuit.

FIG. 4 depicts a circuit diagram illustrating active low-pass filter 8 containing a fourth-harmonic active filter and an image enhancing circuit. The basic construction of the fourth-.harmonic active filter is a tandem of two second-harmonic active filters shown in FIG. 5. Emitter follower amplifiers A7 and A2 shown in FIG. 4 are replaced by amplifier Amp of gain 1 in FIG. 5. In FIG. 5, capacitors and C2, resistors R, and amplifier Amp of gain 1 are indicated. The basic second-harmonic active filter needs amplifier Amp of gain 1 in the necessary frequency range. Pairs of resistors R1, R2 and R4, R5 in FIG. 4 correspond to resistors R in FIG. 5. Pairs of capacitors C1 and C2; CB and C4 in FIG. 4 correspond to capacitors C1 and C2 in FIG. 5.

The characteristic of active low-pass filter 8 is given by the Formula $$T(jw) = \frac{\omega_0^2}{-\omega^2 + j\frac{\omega\omega_0}{Q} + \omega_0^2} \quad (1)$$

where $\omega_0$ and $Q$ are formulas $$\omega_0 = \frac{1}{R\sqrt{C_1 \cdot C_2}} \quad Q = \frac{1}{2}\sqrt{\frac{C_1}{C_2}}$$

where $\omega = F\omega_0$, and normalize formula (1), then, Eq. (1) may be rewritten as $$T(F) = \frac{1}{(1-F)^2 + j\frac{F}{Q}}$$

If $Q=0.5$, the characteristic of $20\times\log |T(F)|$ dB is shown by a curve A in FIG. 6.

If the value of $\omega_0$ set on curve A is doubled and the value of $Q$ is made 2, the characteristic is given by a curve B in FIG. 6. If the second-harmonic active filter having the curve A and B characteristics are tandem-connected, therefore, we can obtain the fourth-harmonic active filter having a curve C characteristic in FIG. 6. Curve C characteristic has a sharper decline than any of the curve A and B characteristics shown.

The simple image enhancing circuit of FIG. 4 is formed of a parallel circuit of resistor R7 with capacitor C5, a series circuit of resistor R8 and capacitor C6 in series therewith, and capacitor C7 in parallel therewith. The image enhancing circuit can heighten the contour of an image.

Figure 7:
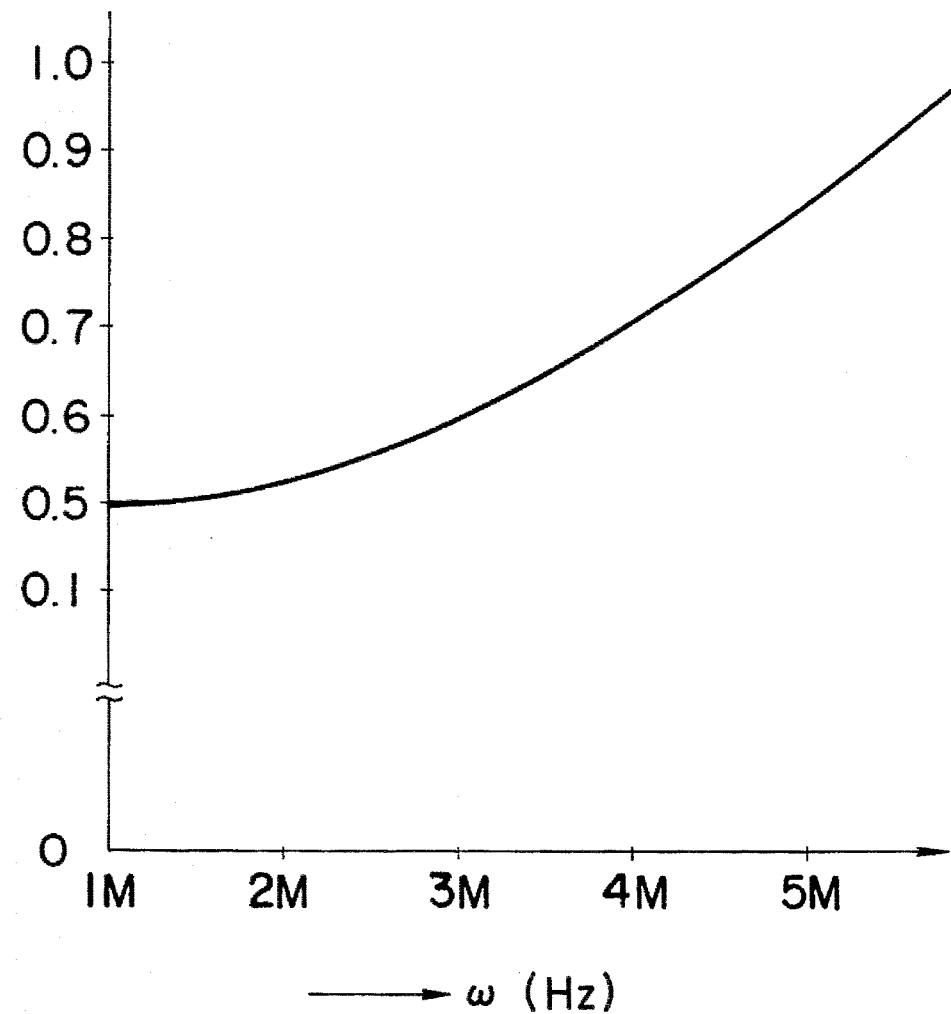
FIG. 7 is a graph illustrating an image enhancing characteristic at the frequencies of the power supply circuit.

Capacitor C6 has capacity high enough to keep the dc level of the signal output of the active filter, but has no effect in the frequency band of the video signal. FIG. 7 is a graph showing an example of frequency response with R7=R8=1 Kohm, C5=30 PF, and C7=15 PF.

As described so far, the present invention uses power supply circuit 20 formed of the charging circuit of voltage doubling charging type and active low-pass filter 8. The television camera of the present invention therefore provides the effect that no transformer and coil are needed, thereby allowing the camera to be made smaller. In addition, the present invention employs trigger signal. (c) for triggering power supply circuit 20 as the signal (c1) or (c2) having the rising or falling edges during the blanking period BLK of the video signal (b). The television camera of the present invention also provides the effect that switching noises due to the rising or falling edges will not affect the image of video output signal (a). This means that no shielding is needed for power supply circuit 20, thereby allowing the camera to be made even smaller.

What is claimed is:

1. A circuit for improving the compactness of a compact television camera comprising; synchronizing signal generating means; a voltage doubling charging power supply connected to receive a synchronizing pulse from said synchronizing signal generating means, said voltage doubling charging power supply having an input switching transistor receiving said synchronizing pulse from said synchronizing signal generating means for turning said voltage doubling charging power supply on and off at preselected periods; timing signal generating means connected to receive a timing pulse from said synchronizing signal generating means; a vertical driver and a horizontal driver receiving the output from said timing signal generating means for generating vertical and horizontal scanning signals respectively; CCD pick-up means receiving said vertical and horizontal scanning signals from said timing signal generating means and outputting a video signal; a fourth harmonic active low pass filter means receiving a video signal from said CCD pick-up means, said fourth harmonic active low pass filter means comprised of a pair of second harmonic active filters in tandem having emitter follower amplifiers with a gain of one for eliminating high frequency components of said video signal; blanking circuit means for blanking said circuit video signal received from said fourth harmonic active low pass filter means; output amplifying means receiving the output of said fourth harmonic active low pass filter for amplifying and producing a video output signal; said synchronizing signal generating means producing said pulse to turn said voltage doubling charging power supply on or off during a blanking period produced by said blanking circuit means; said on and off pulses from said signal generating means having a falling and rising edge during a blanking period or a falling edge during a first blanking period and a rising edge during the next blanking period; said rising and falling edges being synchronized with the beginning and end of said blanking period; and an image enhancing circuit comprised of a parallel RC circuit, a series RC circuit in series with said parallel RC circuit receiving the output of said fourth harmonic active low pass filter means for heightening the contour of an image; whereby the size of said compact television camera can be reduced.

* * * * *